(12) United States Patent
Iida et al.

(10) Patent No.: US 9,129,373 B2
(45) Date of Patent: Sep. 8, 2015

(54) APPARATUS FOR EVALUATING THE ACCURACY OF A SPECT OR PET SYSTEM USING A PHANTOM FILLED WITH A RADIOISOTOPE

(71) Applicants: Nihon Medi-Physics Co., Ltd., Tokyo (JP); National Cerebral and Cardiovascular Center, Osaka (JP)

(72) Inventors: Hidehiro Iida, Osaka (JP); Tsutomu Zeniya, Osaka (JP); Yuki Hori, Osaka (JP); Mayumi Nakazawa, Tokyo (JP)

(73) Assignees: NIHON MEDI-PHYSICS CO., LTD., Tokyo (JP); NATIONAL CEREBRAL AND CARDIOVASCULAR CENTER, Osaka (JP)

( * ) Notice: Subject to any disclaimer, the term of this patent is extended or adjusted under 35 U.S.C. 154(b) by 295 days.

(21) Appl. No.: 13/626,306

(22) Filed: Sep. 25, 2012

(65) Prior Publication Data

US 2013/0251226 A1 Sep. 26, 2013

(30) Foreign Application Priority Data

Mar. 21, 2012 (JP) ................................. 2012-063375

(51) Int. Cl.
*G06K 9/00* (2006.01)
*G06T 5/00* (2006.01)
*G06T 11/00* (2006.01)

(52) U.S. Cl.
CPC ............... *G06T 5/003* (2013.01); *G06T 11/008* (2013.01)

(58) Field of Classification Search
None
See application file for complete search history.

(56) References Cited

U.S. PATENT DOCUMENTS

2006/0226836 A1* 10/2006 Shu et al. ...................... 324/309

FOREIGN PATENT DOCUMENTS

JP 2007-071778 3/2007

OTHER PUBLICATIONS

Lodge, Martin A., Arman Rahmim, and Richard L. Wahl. "A practical, automated quality assurance method for measuring spatial resolution in PET." Journal of Nuclear Medicine 50.8 (2009): 1307-1314.*
Maes et al. "Multimodality Image Registration by Maximization of Mutual Information" IEEE Transactions on Medical Imaging, vol. 16, No. 2, Apr. 1997, pp. 187-198.

* cited by examiner

*Primary Examiner* — Nirav G Patel
(74) *Attorney, Agent, or Firm* — Jason H. Vick; Sheridan Ross, PC

(57) ABSTRACT

A measuring image acquisition means 2 acquires a 3-D measuring image in which a phantom filled with the radioactive material into a necessary part is measured with a SPECT system. A measuring image Fourier transform means 4 operates the 3-D measuring image with the 3-D Fourier transform. An actual image acquisition means 6 acquires a 3-D actual image of the part of the phantom which is filled with the radioactive material. An actual image Fourier transform means 8 operates a 3-D actual image with the 3-D Fourier transform. An error image calculation means 10 divides each Fourier transform value of the 3-D Fourier transform measuring image by each Fourier transform value of the corresponding 3-D Fourier transform actual image and acquires a 3-D Fourier transform error image. A point spread function calculation means 12 operates the 3-D Fourier transform error image with the inverse Fourier transform and determines the point spread function image by calculation. A measurement accuracy processing means 14 calculates the measurement accuracy of the measuring apparatus based on the point spread function image.

8 Claims, 13 Drawing Sheets

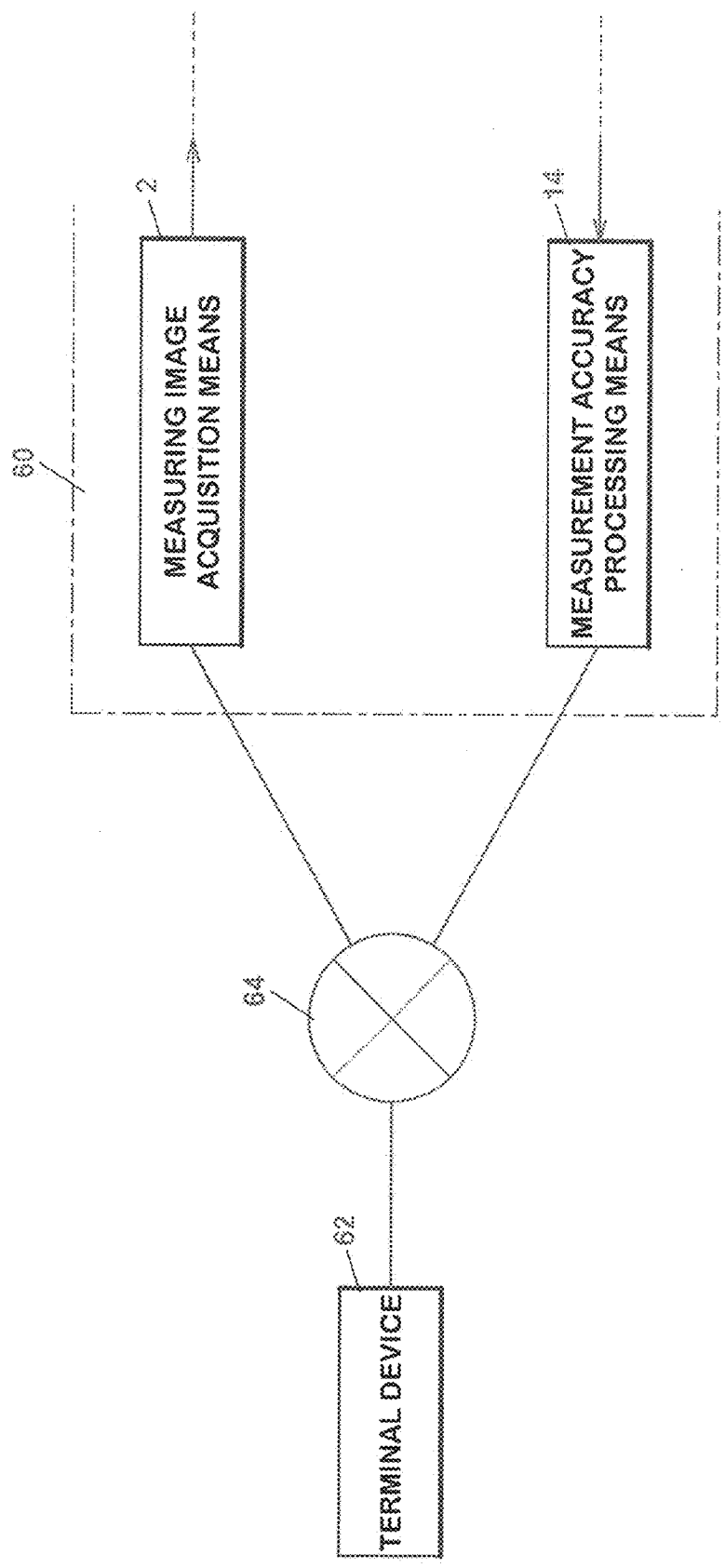

APPARATUS FOR EVALUATING THE ACCURACY OF A SPECT OR PET SYSTEM USING A PHANTOM FILLED WITH A RADIOISOTOPE

CROSS REFERENCE TO RELATED APPLICATIONS

This application claims the benefit under 35 U.S.C. 119(a) to Japanese Patent Application No. 2012-063375, filed Mar. 21, 2012, the entire disclosure of which is incorporated herein by reference in its entirety.

TECHNICAL FIELD

The present invention relates to a technique for evaluating accuracy of an apparatus that measures distribution of a radioisotope, such as a SPECT system or a PET system.

BACKGROUND ART

Measurement of the accuracy of the apparatus for measuring distribution of a radioisotope such as a SPECT system or a PET system is conducted. For example, a test sample containing the radioisotope is filled into a capillary, the capillary is measured with the apparatus mentioned above, the measuring image and an inside diameter of the capillary are compared, and therefore the accuracy can be measured.

In addition, producing a phantom of a target part (brain, for example) and obtaining characteristics of the apparatus such as the SPECT system or the PET system are conducted (Japanese Laid-open Patent Application No. 2007-71778 (JP 2007-71778 A)). For example, administering a drug containing a radioactive material (radioactive drug product) to a patient, measuring the radioactive material with SPECT system, and therefore inspecting the blood flow are conducted as a medical examination. In order to know the characteristics of the SPECT system that is used in the examination, preparing the phantom of the brain, filling the radioactive material into a part where blood vessels of the brain exist (a part corresponding to gray matter), and measuring with the SPECT system are conducted. Accordingly, the characteristics of the SPECT system can be determined. That is to say, because the characteristics of apparatuses vary among manufactures of the system, the characteristics specific to the apparatus (for example, radiodensity in the vicinity of the occipital region is measured at low level) can be obtained through an inspection of the measuring image with the phantom, and therefore more accurate determination can be carried out.

SUMMARY OF THE INVENTION

However, the above-mentioned background art has a following disadvantage. The method using the capillary has a problem that bothers to carry out the measurement with the capillary difficult to handle although the measurement accuracy among the different apparatuses can be compared precisely.

On the other hand, the method using the phantom has a problem that is difficult to precisely compare the measurement accuracy among the different apparatuses although there were large advantages in that the characteristics of the measurement in the apparatus can be obtained to help with diagnosis based on the measuring image.

The object of the present invention is to provide a technique that can solve the problems described above and obtain the characteristics of the measurement as well as a measurement accuracy of the apparatus.

(1)(2) The measurement accuracy evaluation apparatus according to the present invention includes: a measuring image acquisition means that acquires a measuring image in which distribution of a radioisotope in a phantom filled with the radioisotope into a filled region is measured with a measuring apparatus; a measuring image Fourier transform means that operates the measuring image with the 3-D Fourier transform and calculates a 3-D Fourier transform measuring image; a 3-D Fourier transform actual image acquisition means that acquires a 3-D Fourier transform actual image acquired by operating an actual image which shows a shape of the filled region of the phantom with the 3-D Fourier transform; an error image calculation means that divides each Fourier transform value of the 3-D Fourier transform measuring image by each corresponding Fourier transform value of the corresponding 3-D Fourier transform actual image and calculates a 3-D Fourier transform error image; a point spread function image calculation means that operates the 3-D Fourier transform error image with the inverse Fourier transform and calculates a point spread function image; and a measurement accuracy processing means that calculates measurement accuracy of the measuring apparatus based on the point spread function image.

Therefore, the measurement accuracy for a specified direction, a specified plane, average of all directions, and the like can be obtained.

(3)(4) The measurement accuracy evaluation apparatus according to the present invention includes: a measuring image acquisition means that acquires a measuring image in which distribution of a radioisotope in a phantom filled with the radioisotope into a filled region is measured with a measuring apparatus; a measuring image Fourier transform means that operates the measuring image with the Fourier transform for at least an evaluation line or an evaluation plane and calculates a Fourier transform measuring image; a Fourier transform actual image acquisition means that acquires a Fourier transform actual image in which an actual image is operated with the Fourier transform for an evaluation line or an evaluation plane of the actual image showing a shape of the filled region of the phantom which corresponds to the evaluation line or the evaluation plane of the measuring image; an error image calculation means that divides each Fourier transform value of the Fourier transform measuring image by each corresponding Fourier transform value of the corresponding Fourier transform actual image and calculates a Fourier transform error image; a point spread function image calculation means that operates the Fourier transform error image with the inverse Fourier transform and calculates a point spread function image; and a measurement accuracy calculation means that calculates measurement accuracy of the measuring apparatus based on the point spread function image.

Therefore, the measurement accuracy for a specified direction or a specified plane can be obtained.

(5) The measurement accuracy evaluation apparatus according to the present invention is characterized in that the measuring apparatus is a SPECT system or a PET system.

Therefore, the measurement accuracy of the SPECT system or the PET system can be obtained.

(6) The measurement accuracy evaluation apparatus according to the present invention is characterized in that the measurement accuracy processing means performs processing related to the measurement accuracy based on the calculated measurement accuracy.

(7) The measurement accuracy evaluation apparatus according to the present invention is characterized in that the measuring image acquisition means acquires the measuring image that is transmitted from a terminal device connected to the measurement accuracy evaluation apparatus through a network, and the measurement accuracy processing means transmits the calculated measurement accuracy or a processing result of processing related to the measurement accuracy to the terminal device.

Therefore, when facilities have terminal devices, the measurement accuracy can be obtained.

(8) The measurement accuracy evaluation method according to the present invention is a method of evaluating accuracy of an apparatus that measures distribution of a radioisotope, including: operating a measuring image in which the distribution of the radioisotope in a phantom filled with the radioisotope into a filled region is measured with a measuring apparatus with the 3-D Fourier transform and calculating a 3-D Fourier transform measuring image; operating an actual image which shows a shape of the filled region of the phantom with the 3-D Fourier transform and calculating a 3-D Fourier transform actual image; dividing each Fourier transform value of the 3-D Fourier transform measuring image by each corresponding Fourier transform value of the corresponding 3-D Fourier transform actual image and calculating a 3-D Fourier transform error image; operating the 3-D Fourier transform error image with the inverse Fourier transform and calculating a point spread function image; and calculating measurement accuracy of the measuring apparatus based on the point spread function image.

Therefore, the measurement accuracy for a specified direction, a specified plane, average of all directions, and the like can be obtained.

(9) The measurement accuracy evaluation method according to the present invention is a method of evaluating accuracy of an apparatus that measures distribution of a radioisotope, including: operating a measuring image in which the distribution of the radioisotope in a phantom filled with the radioisotope into a filled region is measured with a measuring apparatus with the Fourier transform for at least an evaluation line or an evaluation plane and calculating a Fourier transform measuring image; operating an actual image with the Fourier transform for an evaluation line or an evaluation plane of the actual image which corresponds to the evaluation line or the evaluation plane of the actual image showing a shape of the filled region of the phantom and calculating a Fourier transform actual image; dividing each Fourier transform value of the Fourier transform measuring image by each corresponding Fourier transform value of the corresponding Fourier transform actual image and calculating a Fourier transform error image; operating the Fourier transform error image with the inverse Fourier transform and calculating a point spread function image; and calculating measurement accuracy of the measuring apparatus based on the point spread function image.

Therefore, the measurement accuracy for a specified direction or a specified plane can be obtained.

BRIEF DESCRIPTION OF THE DRAWINGS

FIG. 13 shows an example in a case where the measurement accuracy evaluation apparatus is configured as a server.

EMBODIMENTS OF THE INVENTION

1. Principle of Measurement Accuracy Evaluation

Figure 10A:
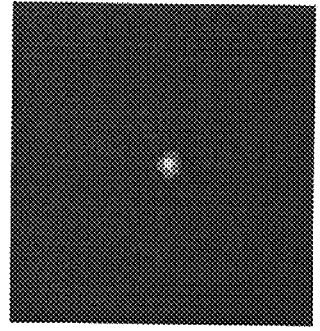
FIG. 10A through 10F are views that show principles of a measurement accuracy evaluation apparatus according to an embodiment.

The principles of the measurement accuracy evaluation according to one embodiment of the present invention will be described with reference to FIG. 10. FIG. 10A is an example of the 3-D measuring image in which a phantom filled with the radioactive material into a necessary part is measured with a measuring apparatus such as the SPECT system. Although the 3-D measuring image is a stereoscopic image, FIG. 10A shows only an image of one part in a plane. As for the following description, although the images of FIG. 6 through FIG. 8 and FIG. 10 are originally stereoscopic images, FIG. 6 through FIG. 8 and FIG. 10 only show images of one part in a plane.

Figure 10B:
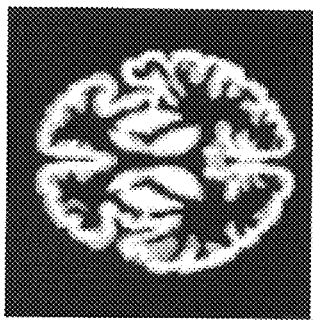
Figure 10C:
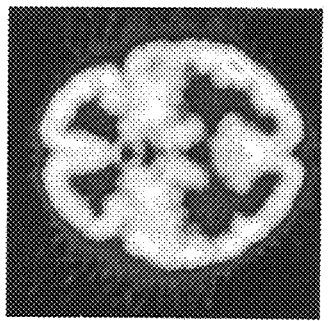

FIG. 10B is a stereoscopic image that shows a 3-D shape of the part of the phantom which is filled with the radioactive material. That image is referred to as a 3-D actual image. When the accuracy of the measuring apparatus is high, the 3-D actual image and the 3-D measuring image agree with each other. The measurement accuracy of the measuring apparatus (so-called resolution) is showed as the point spread function image as shown in FIG. 10C. In other words, when the point spread function image is a blurred and expanded image, the measurement accuracy is said to be low, and when the image is a clear and sharp image, the measurement accuracy is said to be high. Here, the 3-D measuring image is a result of a convolution operation of the point spread function with the 30D actual image.

Figure 10D:
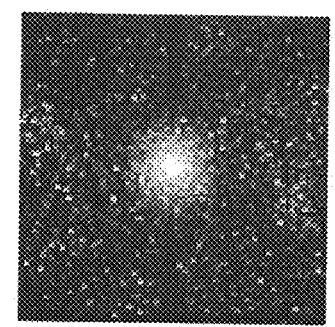
Figure 10E:
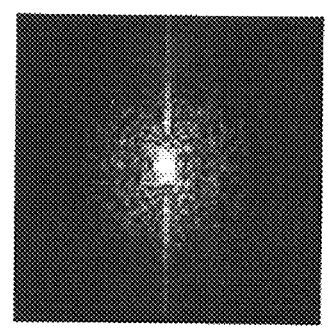

In this embodiment, based on the 3-D measuring image and the 3-D actual image, the point spread function is determined by calculation, and the measurement accuracy of the measuring apparatus is obtained. First, the 3-D measuring image of FIG. 10A is 3-D spatially operated with the Fourier transform. Accordingly, the 3-D Fourier transform measuring image shown in FIG. 10D is obtained. Next, the 3-D actual image of FIG. 10B is 3-D spatially operated with the Fourier transform. Accordingly, the 3-D Fourier transform actual image shown in FIG. 10E is obtained. Here, the 3-D Fourier transform measuring image is obtained by multiplying the 3-D Fourier transform actual image by the value in which the error component is operated with the Fourier transform (referred to as a 3-D Fourier transform error image). Thus, each voxel in the 3-D Fourier transform measuring image of FIG. 10D is divided by corresponding voxel in the 3-D Fourier transform actual image of FIG. 10E, and the 3-D Fourier transform error image of FIG. 10F is obtained.

Figure 10F:
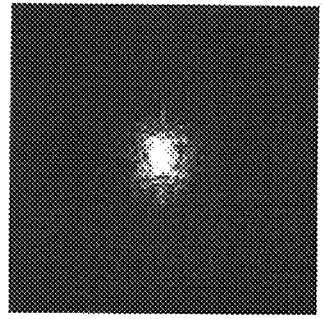

The 3-D Fourier transform error image of FIG. 10F is equal to an image in which the point spread function image of FIG. 10C is operated with the Fourier transform. Therefore, the 3-D Fourier transform error image of FIG. 10F is operated with the inverse Fourier transform, and the point spread function is determined by calculation. Accordingly, the point spread function is determined by calculation, and based on the function, the measurement accuracy of the measuring apparatus is obtained.

2. Functional Block Diagram

Figure 1:
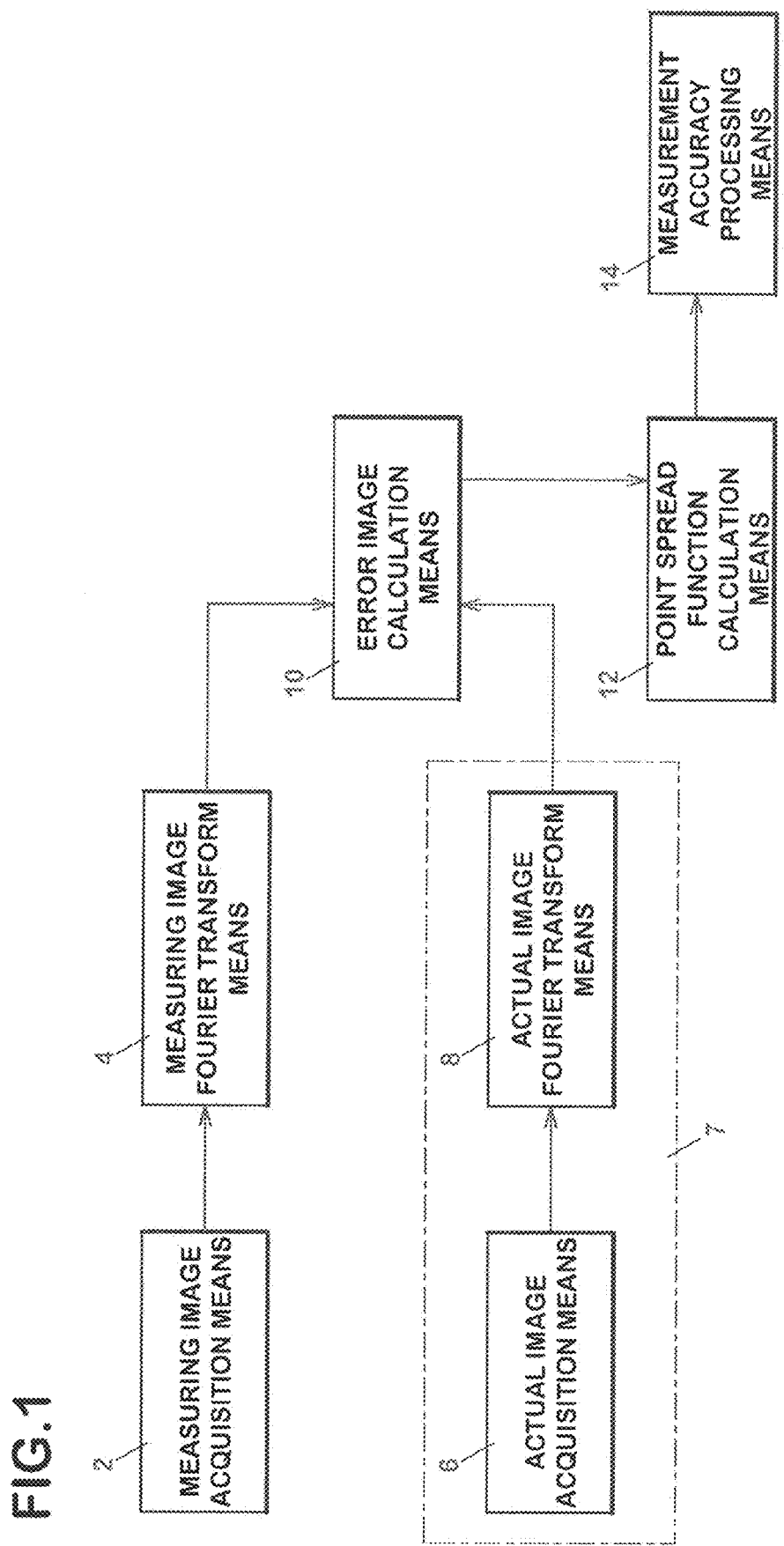
FIG. 1 is a functional block diagram of a measurement accuracy evaluation apparatus according to one embodiment of the present invention.

FIG. 1 shows a functional block diagram of a measurement accuracy evaluation apparatus according to one embodiment of the present invention. A measuring image acquisition means 2 acquires the 3-D measuring image in which a phantom filled with the radioactive material into a necessary part is measured with a measuring apparatus such as the SPECT system. The 3-D measuring image may be acquired from the measuring apparatus directly or from an image that is acquired and recorded from the measuring apparatus in advance. A measuring image Fourier transform means 4 operates the 3-D measuring image that is acquired as described above with the 3-D Fourier transform.

An actual image acquisition means 6 acquires a 3-D shape of the part of the phantom which is filled with the radioactive material as the 3-D actual image. In this embodiment, the 3-D actual image is acquired from the image that is recorded in advance. An actual image Fourier transform means 8 operates the 3-D actual image that is acquired as described above with the 3-D Fourier transform.

In this embodiment, a 3-D Fourier transform actual image acquisition means 7 is constructed with the actual image acquisition means 6 and the actual image Fourier transform means 8. In addition, a 3-D Fourier transform actual image that is acquired as described above may be recorded in advance, and the 3-D Fourier transform actual image acquisition means 7 may acquire the recorded image.

An error image calculation means 10 divides each Fourier transform value of the 3-D Fourier transform measuring image by each Fourier transform value of the corresponding 3-D Fourier transform actual image. Accordingly, the 3-D Fourier transform error image is obtained.

A point spread function calculation means 12 operates the 3-D Fourier transform error image with the inverse Fourier transform and determines the point spread function image by calculation. A measurement accuracy processing means 14 calculates the measurement accuracy of the measuring apparatus based on the point spread function image.

3. Hardware Configuration

Figure 2:
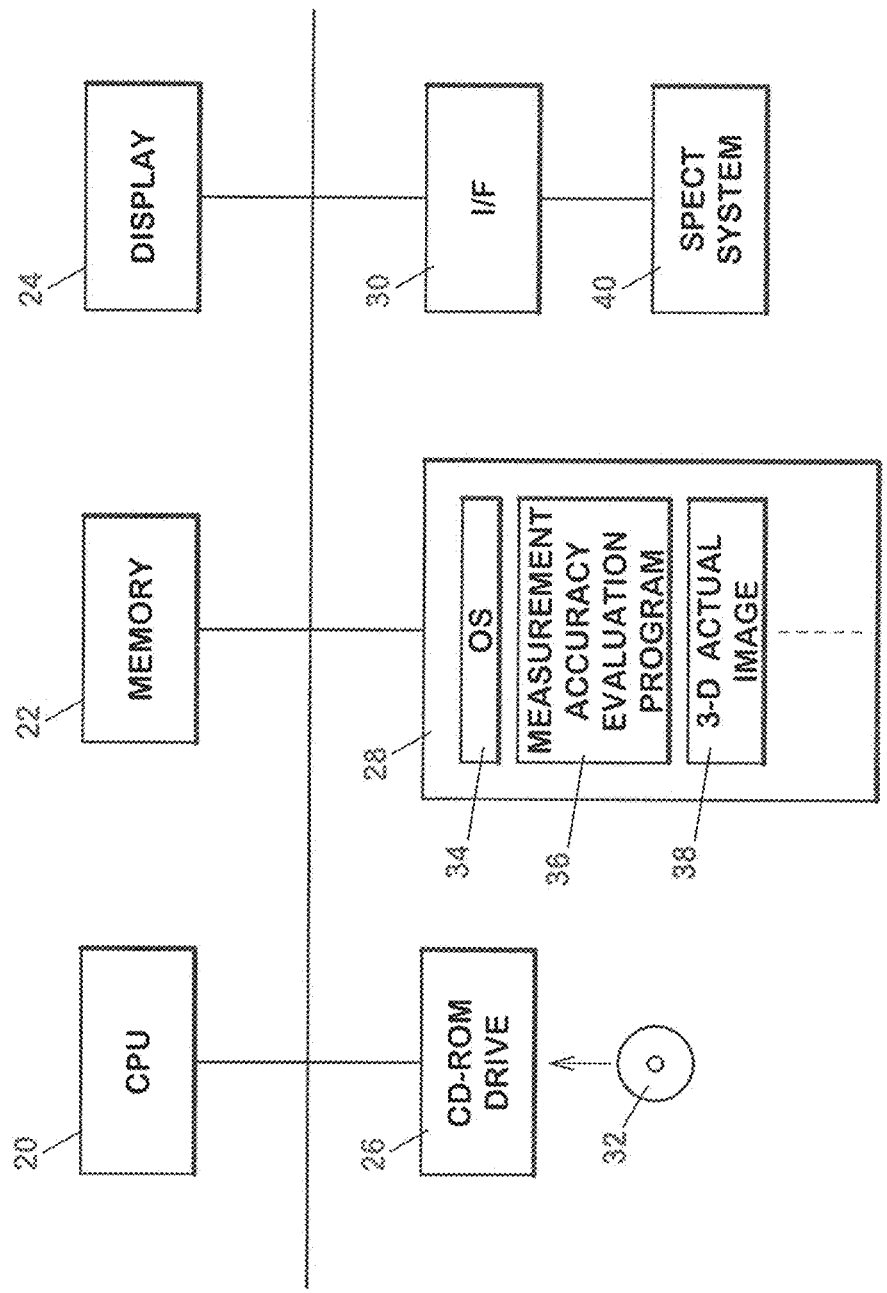
FIG. 2 is a diagram that shows a hardware configuration of a measurement accuracy evaluation apparatus.

FIG. 2 shows the hardware configuration of a measurement accuracy evaluation apparatus according to one embodiment of the present invention. A CPU 20 is connected to a memory 22, a display 24, a CD-ROM drive 26, a hard disk 28, and an interface 30. The memory 22 functions as a work area. The hard disk 28 stores an operating system (for example, Microsoft Windows™) 34, a measurement accuracy evaluation program 36, a 3-D actual image 38, and the like.

The measurement accuracy evaluation program 36 cooperates with the operating system 34 to perform its function. The 3-D actual image 38 is 3-D image data for a filled region of the radioisotope in the phantom. In this embodiment, the 3-D actual image 38 is recorded in advance; however, the image may be captured as needed.

Both of the operating system 34 and the measurement accuracy evaluation program 36 are recorded on a CD-ROM 32 and installed onto the hard disk 28 through the CD-ROM drive 26.

A SPECT system 40 is connected through the interface 30. Therefore, the 3-D measuring image that is measured by the SPECT system 40 can be captured directly through the interface 30. In addition, the 3-D measuring image that is measured by the SPECT system 40 may be recorded on the CD-ROM and captured through the CD-ROM drive 26.

4. Processing of Measurement Accuracy Evaluation Program

Figure 3:
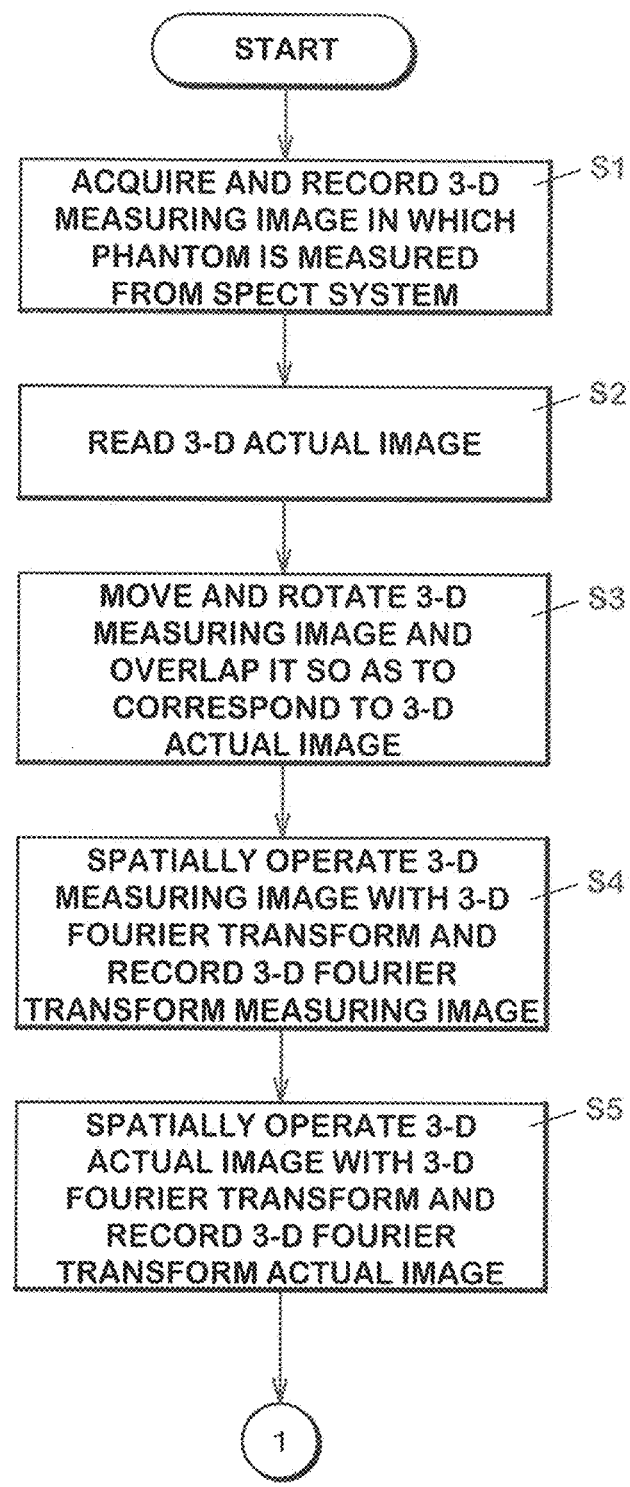
FIG. 3 is a flowchart of a measurement accuracy evaluation program 36.
Figure 4:
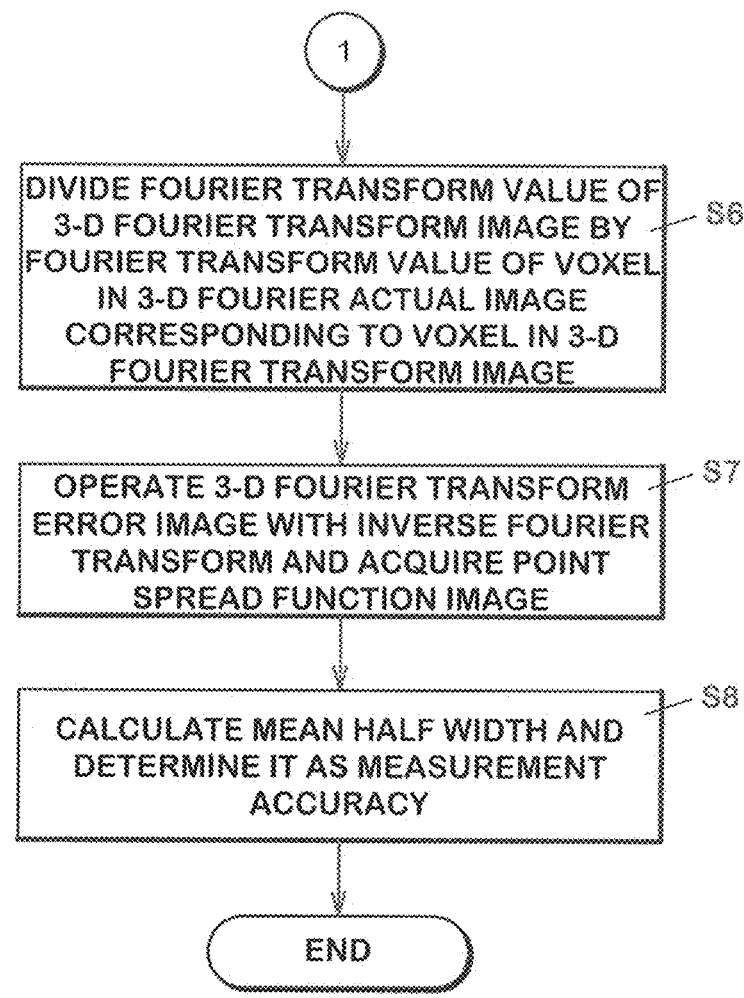
FIG. 4 is a flowchart of a measurement accuracy evaluation program 36.

FIG. 3 shows a flowchart of the measurement accuracy evaluation program 36. The CPU 20 first acquires the 3-D measuring image of the phantom from the SPECT system 40 through the interface 30 and records it on the hard disk 28 (step S1).

Figure 5A:
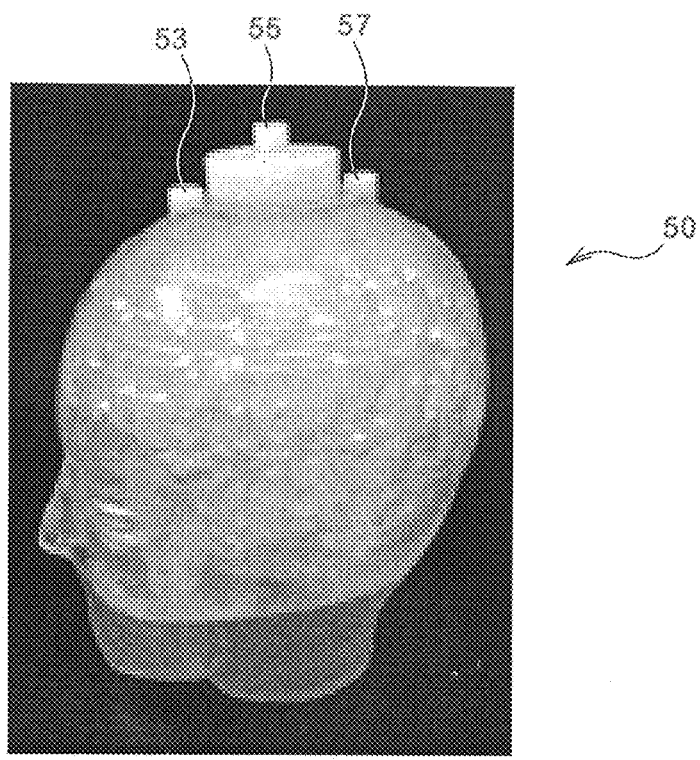
FIGS. 5A and 5B are views that show a brain phantom.
Figure 5B:
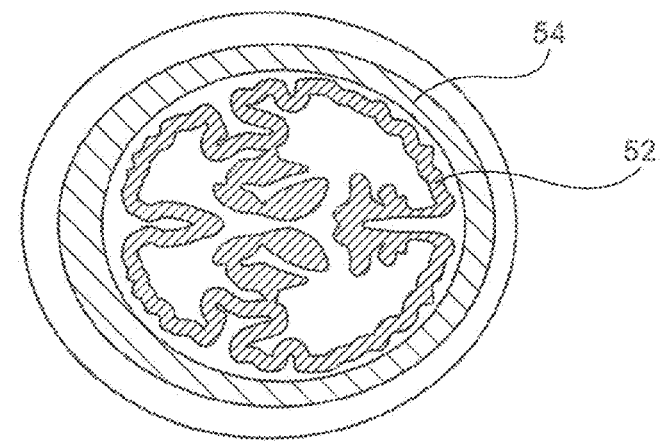

A phantom 50 that is used in this embodiment is shown in FIGS. 5A and 5B. FIG. 5B is a transverse sectional view of FIG. 5A. In the phantom 50, two spaces are provided. Those are a space of a part corresponding to the gray matter and a space of a part corresponding to a bone.

In FIG. 5B, a space 52 is a space corresponding to the gray matter, and a space 54 is a space corresponding to the bone. A fill port 55 shown in FIG. 5A is for filling the test sample into the space 52, and fill ports 53 and 57 are for filling the test sample into the space 54.

In this embodiment, the test sample containing the radioisotope (such as $^{123}I$) was injected into the space 52 corresponding to the gray matter. In addition, a $K_2HPO_4$ solution of which the concentration is adjusted so that the absorption coefficient becomes the same as that of the bone (for example, a solution in which 100 g of $K_2HPO_4$ was dissolved in 67 g of water) was injected into the space 54 corresponding to the bone. The reason why the test sample containing the radioisotope is injected into the space corresponding to the gray matter is that the blood vessels are concentrated in the gray matter and the radioactive drug product is distributed to the gray matter in the actual examination. In addition, a bone region has a property of absorbing the gamma ray emitted from the radioisotope. Therefore, in order to simulate the property, the $K_2HPO_4$ solution that is adjusted so that the absorption coefficient becomes the same as that of the bone is injected into the space 54.

Figure 6A:
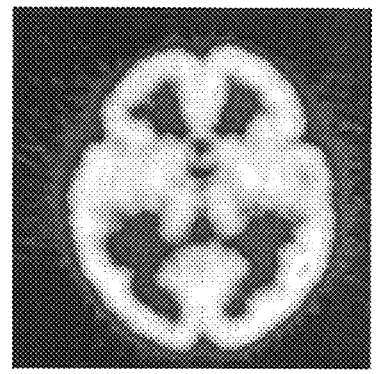
FIG. 6A is a 3-D measuring image.

The 3-D measuring image in which the above mentioned phantom is measured with the SPECT system is captured and recorded in the step S1. FIG. 6A shows an example of the 3-D measuring image. Although the 3-D measuring image is a stereoscopic image that is constructed with voxels, FIG. 6A only shows a plane of a part of the image. Hereinafter, FIG. 6 through FIG. 12 are shown in a similar manner.

Next, the CPU 20 reads the 3-D actual image 38 (3-D image data for the filled region of the radioisotope in the phantom) from the hard disk 28 (step S2). Then, the CPU 20 performs registration between images so that the 3-D measuring image corresponds to the 3-D actual image 38 (see FIG. 6B) (step S3). In this embodiment, the 3-D measuring image is slightly moved and rotated, mutual information in each position is determined by calculation, and the position where the most of both images overlap one another is found. The registration using the mutual information is described in detail by F. Maes et al., "Multimodality Image Registration by Maximization of Mutual Information," IEEE Transactions on Medical Imaging, (USA), 1997, 16, 2, p 187-198.

Next, the CPU 20 performs the 3-D Fourier transform spatially for the captured 3-D measuring image (step S4). In this embodiment, the 3-D Fourier transform is operated with the FFT processing.

Figure 7A:
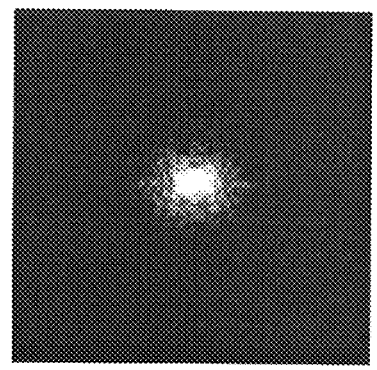
FIG. 7A is a 3-D Fourier transform measuring image.

The 3-D measuring image is configured with the voxels in size that is determined by the SPECT system. Generally, the image is often configured with the voxels of 2 to 3 mm square. The 3-D Fourier transform measuring image that is acquired as described above is recorded on the hard disk 28. FIG. 7A shows the 3-D Fourier transform measuring image.

Figure 6B:
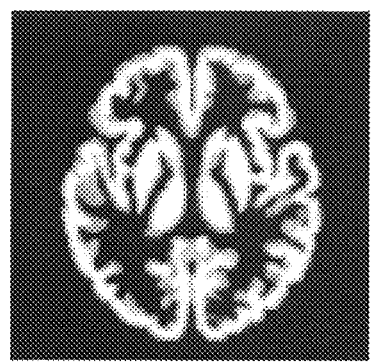
FIG. 6B is a 3-D actual image.
Figure 6C:
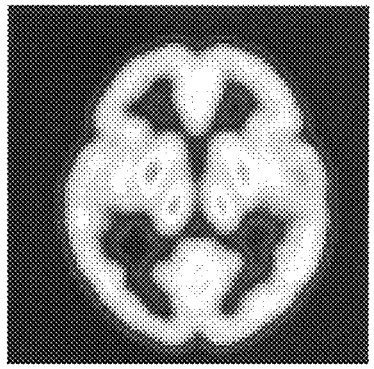
FIG. 6C is a 3-D actual image in which the size of voxels is adjusted.

Next, the CPU 20 reads the 3-D actual image 38 from the hard disk 28 and performs the 3-D Fourier transform spatially (step S5). FIG. 6B shows an example of the 3-D actual image. In this embodiment, the voxel configuring the 3-D actual image 38 is considerably smaller in size than the voxel of the 3-D measuring image. That is, the image that has a high degree of accuracy is used.

Figure 7B:
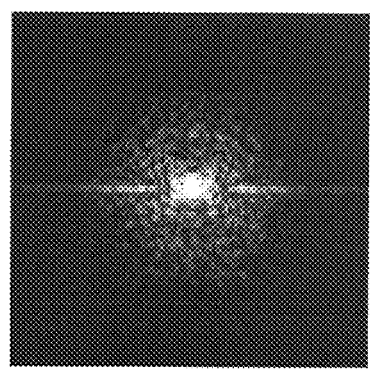
FIG. 7B is a 3-D Fourier transform actual image.

Thus, the CPU 20 converts the 3-D actual image to the voxels of the same size as the 3-D measuring image (see FIG. 6C) and then performs the 3-D Fourier transform. The 3-D Fourier transform actual image that is acquired as described above is recorded on the hard disk 28. FIG. 7B shows the 3-D Fourier transform actual image.

Figure 8A:
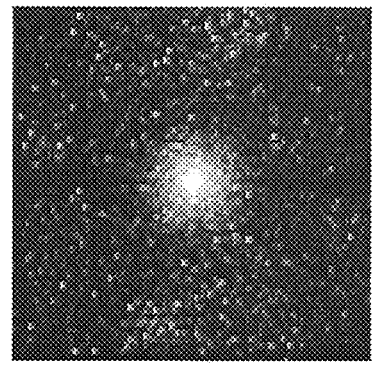
FIG. 8A is a 3-D Fourier transform error image.

Next, the CPU 20 divides a Fourier transform value of each voxel in the 3-D Fourier transform measuring image by a Fourier transform value of the corresponding voxel in the 3-D Fourier transform actual image (step S6). Accordingly, the 3-D Fourier transform error image is obtained. FIG. 8A shows an example of the 3-D Fourier transform error image.

Figure 8B:
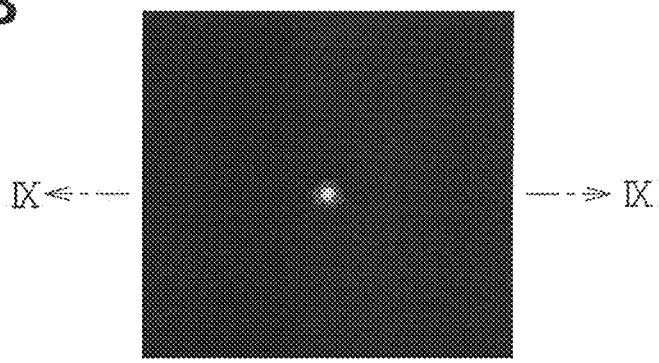
FIG. 8B is a point spread function image.

Subsequently, the CPU 20 operates the 3-D Fourier transform error image with the inverse Fourier transform and acquires the point spread function image (step S7). FIG. 8B shows the point spread function image. When the point spread function image is a blurred and expanded image, the measurement accuracy is said to be low, and when the image is a clear and sharp image, the measurement accuracy is said to be high.

Figure 9:
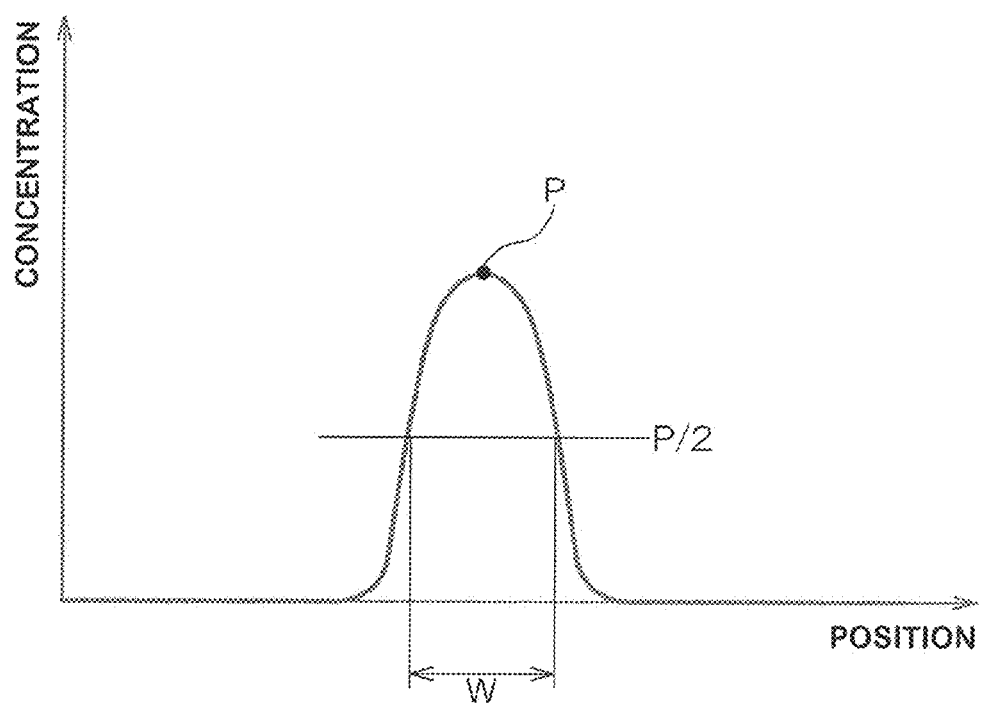
FIG. 9 is a graph that shows concentration change of the point spread function image.

Thus, in this embodiment, half widths in all directions are averaged to determine a mean half width by calculation, and the mean half width is determined to be the measurement accuracy of the apparatus (step S8). FIG. 9 shows the concentration change taken along the line IX-IX of the point spread function image shown in FIG. 8B. A position where the concentration is equal to P/2 that is a half of a peak concentration P at that time is specified, and the width W is calculated as the half width. Because the point spread function image is a stereoscopic image, the above processing is conducted for all directions to calculate the half widths W, and then the mean value is determined by calculation.

4. Experimental Example

Figure 11A:
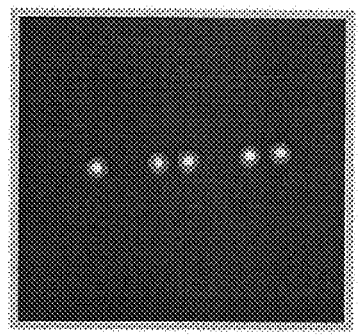
FIG. 11A is a measuring image in which a capillary filled with a radioactive material is measured.
Figure 11B:
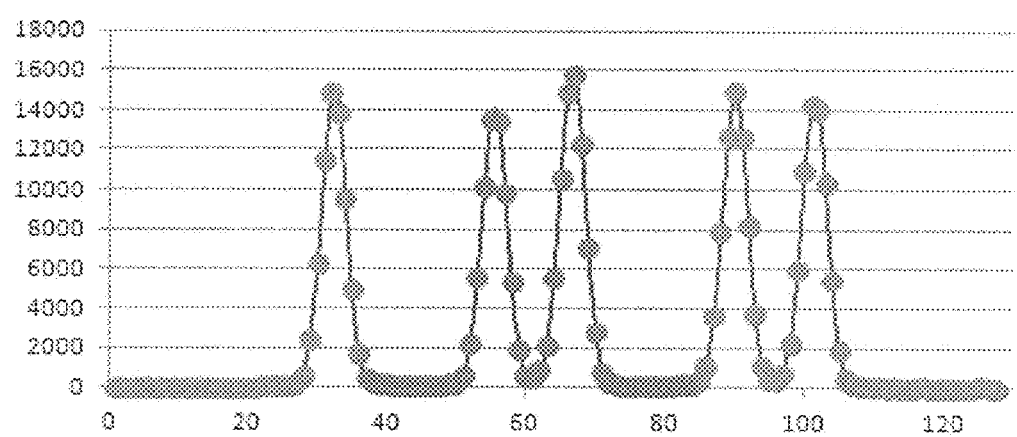
FIG. 11B is a graph of change in the concentration.

FIG. 11A shows an image that is measured with the SPECT system (manufactured by TOSHIBA Corporation, Model: GCA7200A) after the N-Isopropyl-p-iodoamphetamine ($^{123}$I) (manufactured by Nihon Medi-Physics Co., Ltd.) hydrochloride solution equal to approximately 30 MBq of amount of radioactivity is injected into the capillary with the inside diameter of 0.8 mm. In this example, measurements were conducted of five capillaries. In addition, FIG. 11B is a graph that shows the concentration change in a straight line on the image of FIG. 11A.

Figure 11C:
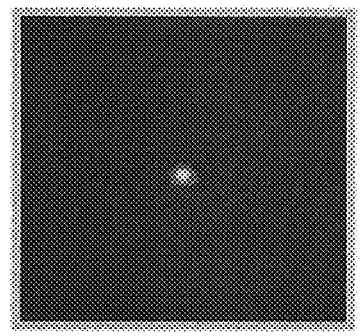
FIG. 11C is a point spread function image that is calculated by one embodiment.

The solution in which the N-Isopropyl-p-iodoamphetamine ($^{123}$I) (manufactured by Nihon Medi-Physics Co., Ltd.) hydrochloride equal to approximately 30 MBq of amount of radioactivity was diluted with water to the volume of 3 liters was injected into the space 52 corresponding to the gray matter of the brain phantom, and the solution that was prepared by mixing $K_2HPO_4$ and water in the proportions of 100 g to 67 g was injected into the space 54 corresponding to the bone region. The solutions were measured with the above mentioned SPECT system. FIG. 11C shows the calculated point spread function image.

The half width of the image measured with the capillary averaged 9.1 mm. The inside diameter of 0.8 mm is small enough and can be ignored in view of the resolution of the SPECT system (it can be considered as an infinitely small point).

On the other hand, the half width obtained from the method of the present invention was 9.6 mm. The present invention is calculating the spread of the measuring image on the assumption that the radioactive material exists in the infinitely small point.

As described above, the calculation result of the measurement accuracy according to the method of the present invention reveals that comparable results to the conventional method using the capillary can be obtained.

5. Other (1) In the embodiment described above, the processing for calculating the measurement accuracy has been described. However, the processing for comparing the 3-D measuring image that is acquired by the measurement with the 3-D actual image (calculating the difference of the concentration value with respect to the corresponding voxel) and obtaining the characteristic of the measuring apparatus can be conducted also. Accordingly, the characteristic of the apparatus in conjunction with the measurement accuracy can be obtained.

Figure 12A:
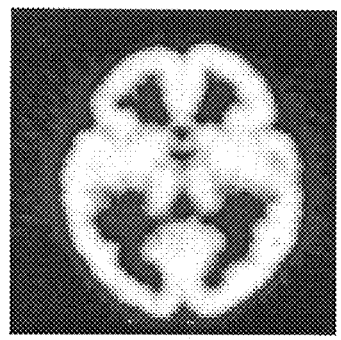
FIGS. 12A through 12E are views for explaining the calculation of the characteristics of the apparatus.
Figure 12B:
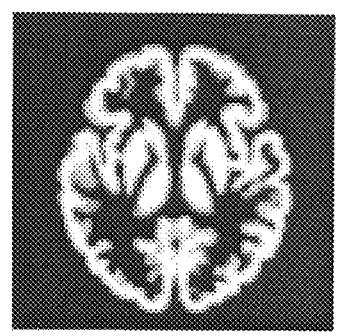

For example, it is hypothesized that the 3-D measuring image as shown in FIG. 12A can be acquired by the SPECT system. In addition, the image of the filled region in the phantom at that time (3-D actual image) is shown in FIG. 12B.

The size of the voxel of the 3-D actual image is adjusted to the same size as that of the voxel of the 3-D measuring image. The 3-D actual image acquired as described above is shown in FIG. 12D. The voxel through the SPECT system is considerably larger than the voxel of the 3-D actual image. The size difference means that the resolution of the SPECT system is low.

When there is no local measurement bias in the measurement with the SPECT system, the 3-D measuring image should become equal to the 3-D actual image in which the voxel is enlarged as described above. The difference between both images means that the measurement error is locally produced in the SPECT system. That error is referred to as the characteristic of the apparatus.

Figure 12C:
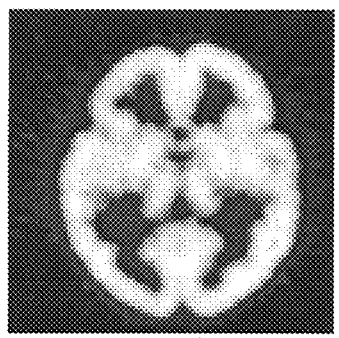
Figure 12D:
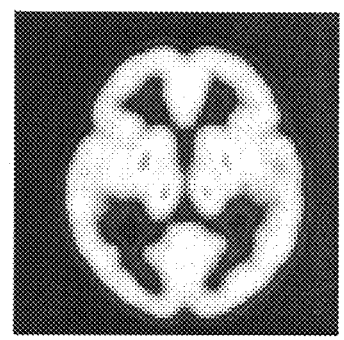
Figure 12E:
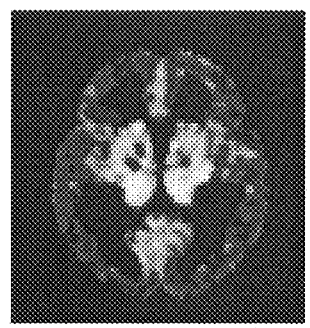

The characteristic of the apparatus can be obtained by calculating the difference between the 3-D measuring image of FIG. 12C and the voxel converted 3-D actual image shown in FIG. 12D. FIG. 12E shows the characteristic of the apparatus.

Accordingly, by obtaining the characteristic of the apparatus leads, the determination using the 3-D measuring image can be carried out more correctly.

(2) In the embodiment described above, the SPECT system is described as an example; however, the present invention is applicable to other apparatuses that measure the radiation distribution such as the PET system.

(3) In the embodiment described above, the voxel of the 3-D actual image is adjusted to the voxel of the 3-D measuring image, and then the Fourier transform is operated. However, the Fourier transform may be performed by using the original voxel in the 3-D actual image.

(4) In the embodiment described above, the 3-D measuring image and the 3-D actual image is operated with the Fourier transform, the 3-D Fourier transform error image is calculated based on the 3-D Fourier transform measuring image and the 3-D Fourier transform actual image, and the point spread function image is acquired by operating the 3-D Fourier transform error image with the inverse Fourier transform. However, the point spread function may be calculated directly based on the 3-D measuring image and the 3-D actual image.

(5) In the embodiment described above, the average of the measurement accuracy for all directions is calculated. However, the measurement accuracy for a specific direction and the measurement accuracy for a specific plane may be calculated.

(6) In the embodiment described above, the measurement accuracy is calculated by using the 3-D measuring image and the 3-D actual image. However, the measurement accuracy may be calculated by using a 2-D measuring image and a 2-D actual image in a specified plane. In this case, the 2-D Fourier transform is performed, a 2-D Fourier transform error image is calculated based on a 2-D Fourier transform measuring image and a 2-D Fourier transform actual image, and a 2-D point spread function image is acquired by operating the 2-D Fourier transform error image with the inverse Fourier transform.

Furthermore, the measurement accuracy may be calculated by using a 1-D measuring image and a 1-D actual image in a specified line. In this case, the 1-D Fourier transform is performed.

(7) In the embodiment described above, the half width is calculated as the measurement accuracy. However, the measurement accuracy may be determined from a steepening degree of a waveform and the like.

(8) In the embodiment described above, the brain phantom is described as an example; however, the phantom of other part may be used.

(9) As shown in FIG. 13, a measurement accuracy evaluation apparatus 60 may be configured as a server on the Internet. In this case, the 3-D measuring image is transmitted from a terminal device 62 to the measurement accuracy evaluation apparatus 60 through the Internet 64. The measuring image acquisition means 2 of the measurement accuracy evaluation apparatus 60 receives the 3-D measuring image. The subsequent processing is the same as that of the apparatus shown in FIG. 1. The measurement accuracy calculated by the measurement accuracy processing means 14 is returned to the terminal device 62 through the Internet 64.

Accordingly, the measurement accuracy can be sent back to a facility such as a hospital in response to a request from the facility.

What is claimed is:

1. A measurement accuracy evaluation apparatus comprising:
   memory;
   a program; and
   a CPU, the CPU executing instructions in the program and adapted to:
   acquire a measuring image in which distribution of a radioisotope in a phantom filled with the radioisotope into a filled region is measured with a measuring apparatus, wherein the filled region corresponds to a space corresponding to gray matter;
   operate on the measuring image with the 3-D Fourier transform and calculate a 3-D Fourier transform measuring image;
   acquire a 3-D Fourier transform actual image acquired by operating on an actual image which shows a shape of the filled region of the phantom with the 3-D Fourier transform;
   divide each Fourier transform value of the 3-D Fourier transform measuring image by each corresponding Fourier transform value of the corresponding 3-D Fourier transform actual image and calculates a 3-D Fourier transform error image;
   operate on the 3-D Fourier transform error image with the inverse Fourier transform and calculates a point spread function image; and
   calculate measurement accuracy of the measuring apparatus based on the point spread function image;
   wherein other space of the phantom corresponding to bone is filled with material which has a same absorption coefficient with the bone.

2. The measurement accuracy evaluation apparatus according to claim 1, wherein the measuring apparatus is a SPECT system or a PET system.

3. The measurement accuracy evaluation apparatus according to claim 1,
   wherein CPU further performs processing related to the measurement accuracy based on the calculated measurement accuracy.

4. The measurement accuracy evaluation apparatus according to claim 1,
   wherein the CPU further acquires the measuring image that is transmitted from a terminal device connected to the measurement accuracy evaluation apparatus through a network, and
   transmits the calculated measurement accuracy or a processing result of processing related to the measurement accuracy to the terminal device.

5. A non-transitory computer readable information storage medium having stored thereon instructions that cause a measurement accuracy evaluation apparatus to perform a method comprising:
   acquiring a measuring image in which distribution of a radioisotope in a phantom filled with the radioisotope into a filled region is measured with a measuring apparatus, wherein the filled region corresponds to a space corresponding to gray matter;
   operating on the measuring image with the 3-D Fourier transform and calculates a 3-D Fourier transform measuring image;
   acquiring a 3-D Fourier transform actual image acquired by operating an actual image which shows a shape of the filled region of the phantom with the 3-D Fourier transform;
   dividing each Fourier transform value of the 3-D Fourier transform measuring image by each corresponding Fourier transform value of the corresponding 3-D Fourier transform actual image and calculates a 3-D Fourier transform error image;
   operating on the 3-D Fourier transform error image with the inverse Fourier transform and calculates a point spread function image; and
   calculating measurement accuracy of the measuring apparatus based on the point spread function image;
   wherein other space of the phantom corresponding to bone is filled with material which has a same absorption coefficient with the bone.

6. The non-transitory computer readable medium having a program according to claim 5,
   wherein the measuring apparatus is a SPECT system or a PET system.

7. The non-transitory computer readable medium having a program according to claim 5,
   further comprising performing processing related to the measurement accuracy based on the calculated measurement accuracy.

8. The non-transitory computer readable medium having a program according to claim 5,
  further comprising acquiring the measuring image that is transmitted from a terminal device connected to the measurement accuracy evaluation apparatus through a network, and
  transmitting the calculated measurement accuracy or a processing result of processing related to the measurement accuracy to the terminal device.

* * * * *